(12) United States Patent
Baginski et al.

(10) Patent No.: US 7,840,328 B2
(45) Date of Patent: Nov. 23, 2010

(54) INDUSTRIAL TRUCK WITH A DISPLAY UNIT FOR THE OPERATOR

(75) Inventors: Ralf Baginski, Neetze (DE); Frank Manken, Henstedt-Ulzburg (DE); Martin Von Werder, Ammersbek (DE)

(73) Assignee: Juugheinrich Aktiengesellschaft, Hamburg (DE)

( * ) Notice: Subject to any disclaimer, the term of this patent is extended or adjusted under 35 U.S.C. 154(b) by 939 days.

(21) Appl. No.: 11/680,317

(22) Filed: Feb. 28, 2007

(65) Prior Publication Data
US 2007/0208477 A1   Sep. 6, 2007

(30) Foreign Application Priority Data
Mar. 3, 2006   (DE) ................... 10 2006 010 293

(51) Int. Cl.
*G06F 19/00* (2006.01)
(52) U.S. Cl. ........................... 701/50; 701/117
(58) Field of Classification Search ............ 701/36, 701/50, 117, 118, 119, 300; 700/213, 214; 235/385
See application file for complete search history.

(56) References Cited

U.S. PATENT DOCUMENTS

| | | | |
|---|---|---|---|
| 5,151,684 A * | 9/1992 | Johnsen | 340/568.1 |
| 6,669,089 B2 * | 12/2003 | Cybulski et al. | 235/385 |
| 7,155,304 B1 * | 12/2006 | Charych | 700/214 |
| 7,387,243 B2 | 6/2008 | Magens et al. | |
| 2002/0070862 A1 | 6/2002 | Francis et al. | |

FOREIGN PATENT DOCUMENTS

| | | |
|---|---|---|
| CN | 147908 | 3/2004 |
| DE | 100 15 009 A1 | 10/2001 |
| DE | 20 2005 015 095 U1 | 2/2006 |
| GB | 2 360 500 B | 3/2000 |

OTHER PUBLICATIONS

Betriebstechinik aktuell, 39, 1998, 10, pp. 34, 35.
Hebezeuge und Fordermittel, Berlin 45, 2005, 5, pp. 246, 247.
Logistik fur Unternehmen, Nov. 12, 2005, p. 15.

* cited by examiner

*Primary Examiner*—Richard M. Camby
(74) *Attorney, Agent, or Firm*—Vidas, Arret & Steinkraus

(57) ABSTRACT

Industrial truck with a display unit for an operator and with a sending and receiving unit directed towards the load pick-up region, which can receive sent data from load goods and from load supports, and an analyzing unit, which displays the received data in the display unit, wherein the analyzing unit examines the data received from a load good with respect to transportation conditions and displays existing transportation conditions in the display unit.

7 Claims, 1 Drawing Sheet

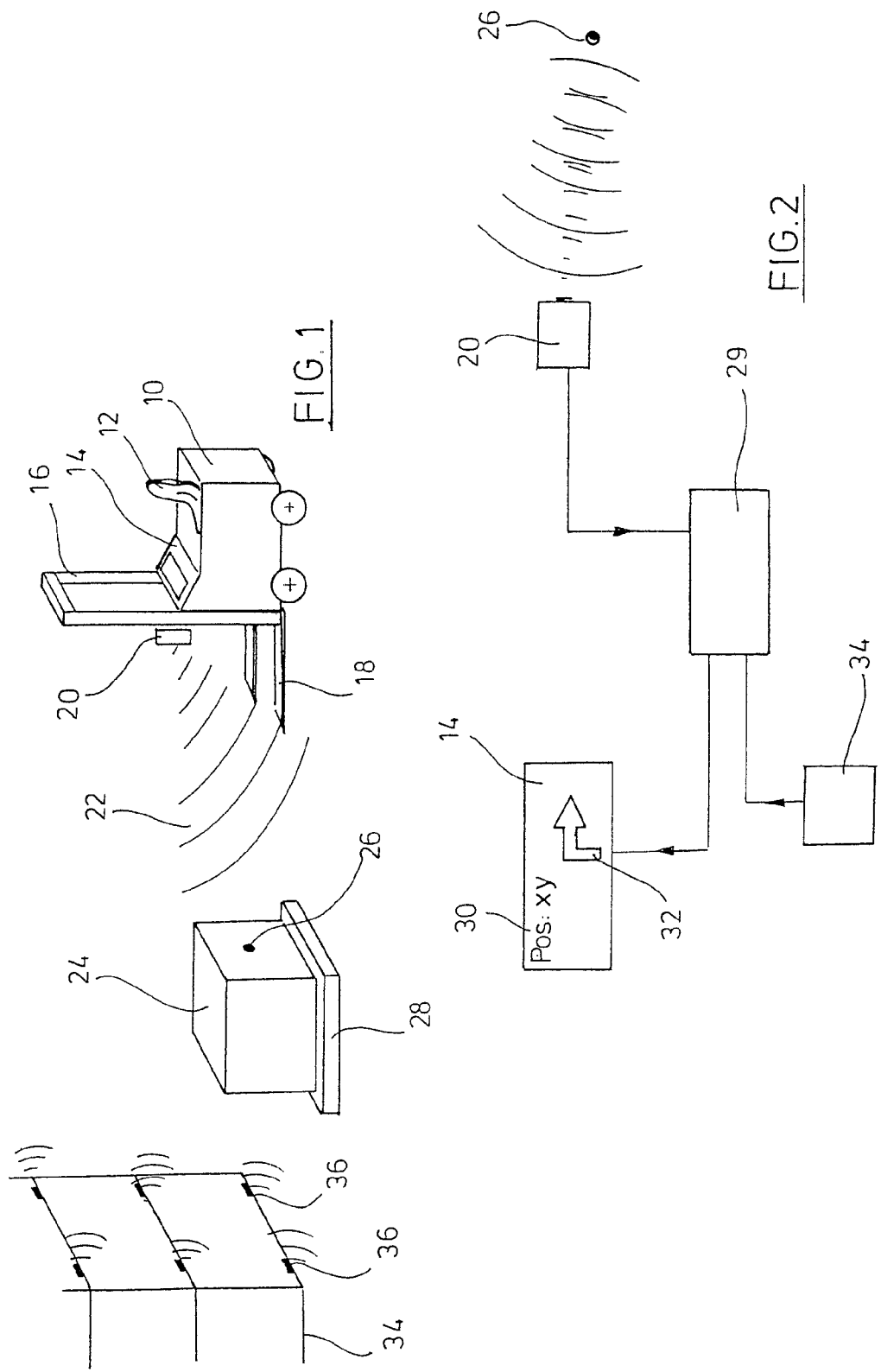

INDUSTRIAL TRUCK WITH A DISPLAY UNIT FOR THE OPERATOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an industrial truck with a display unit for an operator.

In conventional stockroom processes, the driver gets his/her actual driving instruction via a so-called data terminal, which displays the actual jobs for stocking in and out. Such data terminals are centrally transmitted to the vehicle from a system for administration and transport organisation, by wireless for instance. For the support of such a system, it is also already known to provide the goods with a barcode and to read out the barcode on the ware. If necessary, it can be also provided in such a system to provide the ware with a new barcode, after commissioning of a ware or upon relocation of the ware, for example.

The present invention is based on the objective to provide an industrial truck which provides the possibility to simplify the transportation processes in the application of manually operated industrial trucks with simple means.

BRIEF SUMMARY OF THE INVENTION

The industrial truck according to the present invention has a display unit for the operator. Further, the industrial truck is equipped with a sending and receiving unit, which is oriented towards the load pick-up region in particular and even beyond. The sending and receiving unit can read information from load goods or from load supports. Preferably, the sending and receiving unit is arranged for transponders, RFID transponders being preferably provided in this. The sending and receiving unit is connected to an analysing unit. The analysing unit transmits the read-out data to the display unit, where they are displayed. Thus, the industrial truck according to the present invention has a sending and receiving unit which is connected with the display unit in the industrial truck. According to the present invention, the data read from a load good are examined with respect to transportation conditions for the ware and the existing transportation conditions are displayed on the display unit. The difference to the already known data terminals is that here, no data are sent from a central entity in the stockroom to the industrial truck, but that each industrial truck reads data from the load goods and the load supports individually and in a decentralised manner. The decentralised attempt makes sure that each industrial truck provides the necessary data up-to-date to its operator. Preferably, the sending and receiving unit is arranged for RFID transponders. The transponders are preferably realised as UHF transponders, the signals of which can be read and received over the distance of several meters.

Preferably, the industrial truck according to the present invention has an analysing unit, which examines the data read from a load good with respect to an indicated transport destination and displays existing information about the transport destination in the display unit. Thus, the good to be transported communicates to the industrial truck whereto it has to be transported. As a consequence, the operator has no more to pick up its driving instruction centrally or receive it via radio data transmission from a central entity. Also, evident errors in the transport instructions can be recognised more readily, due to the immediate proximity of the user to the ware.

In a preferred embodiment, the data read from a load good are examined with respect to transportation conditions for the ware and existing transportation conditions are displayed on the display unit.

Preferably, the transportation conditions may also contain information which is related to a permitted maximum speed for the transportation and/or a driving program, for instance.

Preferably, the industrial truck according to the present invention reads also data from the handling stations, which are equipped with transponders.

BRIEF DESCRIPTION OF SEVERAL VIEWS OF THE INVENTION

In the following, the industrial truck according to the present invention is explained in more detail by means of drawings.

FIG. 1 shows a schematic view of an industrial truck with a sending and receiving unit, with a load good having a transponder and a handling station with transponders, and FIG. 2 shows a schematic view of the display as well as of the control unit.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows an industrial truck 10 realised in accordance with the present invention, which is realised as a counterweight stacker with a driver seat 12 and an operation console with a display unit 14 in the shown example. In principle, the present invention can be applied to different types of industrial tucks. The industrial truck 10 has load support means 16 which have a liftable and countersinkable load fork 18. In the region of its load support means 16, the industrial truck is equipped with a sending and receiving unit 20. The sending and receiving unit 20 is disposed on the industrial truck 10 or on its load support means 16 such that the sending and receiving region 22 covers the load supporting means 16 as well as the region in front of the same, at least partially. In addition, the sending and receiving unit may pick up data from the surroundings, from handling stations, delivering trucks and the like. As an example for a handling station, a shelf 34 is shown, which is equipped with transponders 36.

Matching with the industrial truck 10, the good to be transported 24 is equipped with an ultra high frequency RFID-transponder. Alternatively, even the pallet 28 may be equipped with a transponder. In a stockroom, even stocking places and the places in the shelves may be equipped with transponders. In the operation of the industrial truck, the sending and receiving unit 20 sends out a signal, which meets the transponder 26 and is received by the same via an antenna. In a passively dimensioned transponder, the received radiation gives sufficient energy to the former to send its data to the sending and receiving unit 20 in the form of electromagnetic signals. Active transponders may be provided too.

When using RFIF transponders, it is particularly advantageous that these do not necessarily need to be visible for the sending and receiving unit. Instead, the same can be also located on the backside of the ware and can be read from out of the front side without problems.

FIG. 2 shows the schematic data flow. The sending and receiving unit 20 sends electromagnetic radiation in the high frequency range to the transponder 26, which receives the radiation that was sent out. The energy of the received radiation is converted and used for the generation of a correspondingly modulated output signal. The output signal is received again by the sending and receiving unit 20. With the output signal of the transponder, it is preferably dealt with a data stream in which certain information regarding the transponder is contained. Particularly preferred, data pertaining to the destination thereof are already contained in the transponder 26. Thus, for instance, the ware can be provided with transponders in the ware acceptance of the stockroom, the storage place being memorised in the transponders in doing so. As soon as the industrial truck picks up such a ware, it finds out where to transport the ware. Thus, on every ware and/or load support, the place of destination is already memorised.

The received data are forwarded to an analysing unit 29. The analysing unit processes these data and displays them in the display unit 14. In the shown example of realisation, a position indicator 30 is indicated in the display unit 20 and the industrial truck shows the path to this position with an arrow 32. In doing so, the path indication may take place by a navigation system per se known. For the orientation of the industrial truck, it is also possible to use transponders. Thus, for example, the actual real position can be additionally memorised on the transponder. It is also possible that a transponder on the storage location or the shelf place to be addressed, respectively, shows the industrial truck 10 where it just is. From these data, the corresponding information about the path can then be determined.

In addition, a memory 34 is still provided, which permits the control unit 29 to file corresponding data and to read them out again for later operations.

In one possible embodiment, it is also possible to memorise the destination information not directly on the ware but to file it in advance in the memory 34 of the industrial truck in an initiation phase for each ware. For example, shipments expected for this day can be filed with the provided storage position here. In this case, the control unit 29 determines only an identification key from the received data, which characterises the wares. By means of the memory 34, this identification key is then lined up with a position which is then displayed by the control unit 29 via the display unit 14.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Industrial truck with a display unit (14) for an operator and with a sending and receiving unit directed towards the load pick-up region, which can receive sent data from load goods (24) and from load supports (28), and an analysing unit (29), which displays the received data in the display unit (14), wherein the analysing unit examines the data received from a load good with respect to transportation conditions and displays existing transportation conditions in the display unit (14).

2. Industrial truck according to claim 1, characterised in that the sending and receiving unit is designed for transponders.

3. Industrial truck according to claim 1, characterised in that the transponders are realised as RFID-transponders.

4. Industrial truck according to claim 3, characterised in that the RFID-transponders are realised as UHF-transponders.

5. Industrial truck according to claim 1, characterised in that the sending and receiving unit examines the data received from a load good with respect to a transport destination and displays existent information with regard to the transport destination in the display unit (14).

6. Industrial truck according to claim 1, characterised in that the analysing unit is connected with a vehicle control in order to transmit received data, and that received transportation conditions are routed to the vehicle control.

7. Industrial truck according to claim 1, characterised in that in addition, the sending and receiving unit reads also data from handling stations.

* * * * *

UNITED STATES PATENT AND TRADEMARK OFFICE
CERTIFICATE OF CORRECTION

PATENT NO. : 7,840,328 B2
APPLICATION NO. : 11/680317
DATED : November 23, 2010
INVENTOR(S) : Ralf Baginski, Frank Manken and Martin Von Werder It is certified that error appears in the above-identified patent and that said Letters Patent is hereby corrected as shown below:

On the Title page of the Issued Patent, first column, Item (73) Assignee: delete "Juugheinrich Aktiengesellschaft" and insert --Jungheinrich Aktiengesellschaft--.

Signed and Sealed this
Twenty-sixth Day of July, 2011

David J. Kappos
*Director of the United States Patent and Trademark Office*